United States Patent
Bent et al.

(10) Patent No.: US 9,767,139 B1
(45) Date of Patent: Sep. 19, 2017

(54) END-TO-END DATA INTEGRITY IN PARALLEL STORAGE SYSTEMS

(71) Applicant: EMC IP Holding Company LLC, Hopkinton, MA (US)

(72) Inventors: John M. Bent, Los Alamos, NM (US); Sorin Faibish, Newton, MA (US); Zhenhua Zhang, Beijing (CN); Xuezhao Liu, Beijing (CN); Jingwang Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 509 days.

(21) Appl. No.: 14/319,647

(22) Filed: Jun. 30, 2014

(51) Int. Cl.
*G06F 17/30* (2006.01)

(52) U.S. Cl.
CPC .............. *G06F 17/30371* (2013.01)

(58) Field of Classification Search
CPC .. G06F 11/22; G06F 2201/88; G06F 12/0813; G06F 11/0709; G06F 2212/263; G06F 17/30212; G06F 17/30224; G06F 21/6218; G06F 2221/07; G06F 3/067; G06F 9/52; G06F 17/30371; H04L 47/34; G06T 1/20
USPC ............................ 709/224; 713/153; 707/697
See application file for complete search history.

(56) References Cited

U.S. PATENT DOCUMENTS

| | | | | |
|---|---|---|---|---|
| 8,862,561 | B1 * | 10/2014 | Nesbit | G06F 17/30348 707/698 |
| 2007/0186066 | A1 * | 8/2007 | Desai | G06F 11/1448 711/162 |
| 2010/0036861 | A1 * | 2/2010 | Srihari | G06F 17/30 707/602 |
| 2013/0275656 | A1 * | 10/2013 | Talagala | G06F 12/0246 711/103 |

OTHER PUBLICATIONS

Bent et al., Article: "PLFS: A Checkpoint Filesystem for Parallel Applications", Published in: SC '09 Proceedings of the Conference on High Performance Computing Networking, Storage and Analysis Article No. 21, Portland, Oregon—Nov. 14 20, 2009 ACM New York, NY, USA © 2009 table of contents ISBN: 9781605587448, doi>10.1145/1654059.1.*

(Continued)

*Primary Examiner* — Evan Aspinwall
(74) *Attorney, Agent, or Firm* — Ryan, Mason & Lewis, LLP

(57) ABSTRACT

End-to-end data integrity is provided in parallel computing systems, such as High Performance Computing (HPC) environments. An exemplary method is provided for processing data in a distributed data storage system by obtaining the data and one or more corresponding checksum values from a compute node; and providing the data and the one or more corresponding checksum values to the distributed data storage system for storage. One or more checksum values corresponding to the data can be generated if the one or more checksum values are not received from a compute node. Exemplary processes are provided for copy; slice; merge:

(Continued)

and slice and merge functions. The distributed data storage system comprises, for example, one or more Parallel Log-Structured File System (PLFS) storage elements and/or key-value storage elements storing one or more key-value pairs.

20 Claims, 10 Drawing Sheets

(56) References Cited

OTHER PUBLICATIONS

Bent et al., Article: "Storage challenges at Los Alamos National Lab", Published in: Mass Storage Systems and Technologies (MSST), 2012 IEEE 28th Symposium on Date of Conference: Apr. 16-20, 2012, Date Added to IEEE Xplore: Jul. 9, 2012 INSPEC Accession No. 12852534, DOI: 10.1109/MSST.2012.6232376, Publisher: IEEE.*

"The Fast-Forward I/O and Storage Stack", https://users.soe.ucsc.edu/~ivo//blog/2013/04/07/the-ff-stack/.

* cited by examiner

FIG. 5

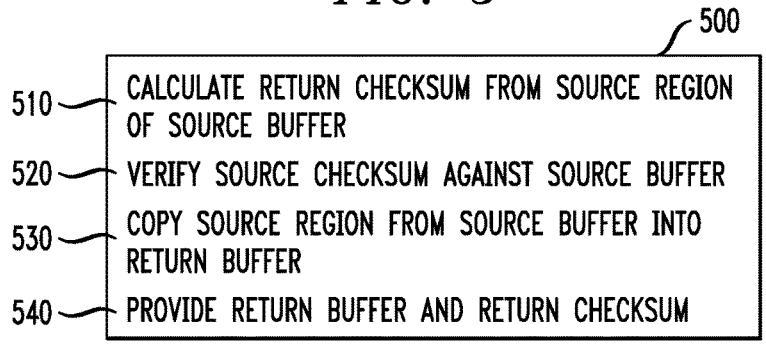

- 510 — CALCULATE RETURN CHECKSUM FROM SOURCE REGION OF SOURCE BUFFER
- 520 — VERIFY SOURCE CHECKSUM AGAINST SOURCE BUFFER
- 530 — COPY SOURCE REGION FROM SOURCE BUFFER INTO RETURN BUFFER
- 540 — PROVIDE RETURN BUFFER AND RETURN CHECKSUM

FIG. 6A

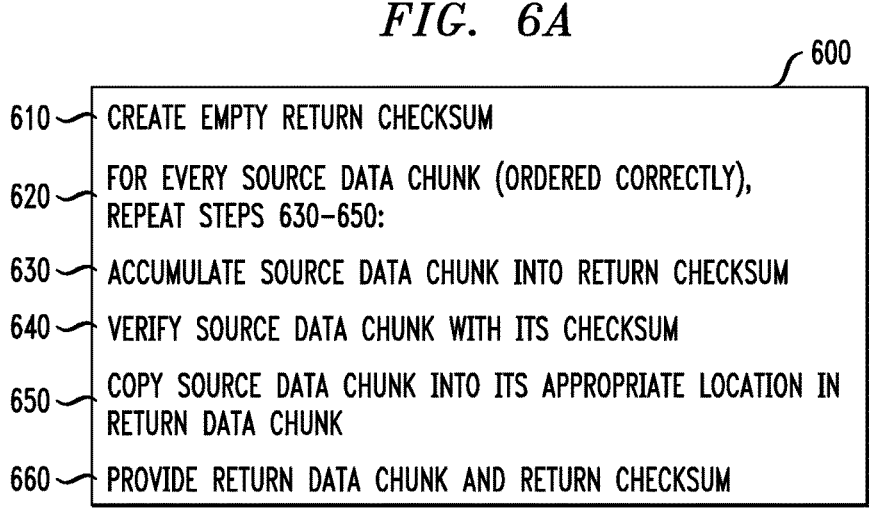

- 610 — CREATE EMPTY RETURN CHECKSUM
- 620 — FOR EVERY SOURCE DATA CHUNK (ORDERED CORRECTLY), REPEAT STEPS 630-650:
- 630 — ACCUMULATE SOURCE DATA CHUNK INTO RETURN CHECKSUM
- 640 — VERIFY SOURCE DATA CHUNK WITH ITS CHECKSUM
- 650 — COPY SOURCE DATA CHUNK INTO ITS APPROPRIATE LOCATION IN RETURN DATA CHUNK
- 660 — PROVIDE RETURN DATA CHUNK AND RETURN CHECKSUM

FIG. 6B

```
mchecksum_init("crc64", &tmpchk);
for (buf, chk) in [(buf1, chk1), (buf2, chk2), (buf3, chk3)] {
    mchecksum_update(tmpchk, &buf, sizeof(buf));  // COMMENT ONE
        if (verify_checksum(buf, chk) == FAILED) return -EIO; // COMMENT TWO
        memcpy(retbuf + offset_i, buf, sizeof(buf));
}
mchecksum_get(tmpchk, &retchk, sizeof(retchk), 1);
return (retbuf, retchk);
```

- 710 — CREATE EMPTY RETURN CHECKSUM
- 720 — FOR EVERY SOURCE REGION (ORDERED CORRECTLY), REPEAT STEPS 730-750, AS FOLLOWS:
- 730 — ACCUMULATE SOURCE REGION OF SOURCE DATA CHUNK INTO RETURN CHECKSUM
- 740 — VERIFY ENTIRE SOURCE DATA CHUNK WITH ITS CHECKSUM
- 750 — COPY REGION OF SOURCE DATA CHUNK INTO ITS APPROPRIATE LOCATION IN RETURN DATA CHUNK
- 760 — PROVIDE RETURN DATA CHUNK AND RETURN CHECKSUM

```
int iod_daos_write(iod objectid, source data chunk, offset, length, source checksum)
{
    data_oh = open_daos_data_object(iod objectid);
    checksum_oh = open_daos_checksum_object(iod objectid);
    checksum_offset = (offset/chunk_size) * sizeof(checksum_t);
    daos_object_write(data_oh, source data chunk, offset, length);
    daos_object_write(checksum_oh, source checksum, checksum_offset, sizeof(checksum_t);
    close all daos objects;
}
```

*FIG. 8B*

```
                                                                    ┌─ 850
int iod_daos_write(iod objectid, source data chunk, offset, length, source checksum)
{
    mchecksum_init("crc64", &tmp_chksum);
    data_oh = open_daos_data_object(iod objectid);
    checksum_oh = open_daos_checksum_object(iod objectid);
    chunk_offset = round_down(offset); // get the start of the whole chunk;
    checksum_offset = (offset/chunk_size) * sizeof(checksum_t);
    original_chunk = malloc(chunk_size);
    daos_object_read(data_oh, original_chunk, chunk_offset, chunk_size);
    mchecksum_update(tmp_chksum, original_chunk, offset - chunk_offset);
    mchecksum_update(tmp_chksum, source data chunk, length);
    sourceend = offset + length - chunk_offset;
    mchecksum_update(tmp_chksum, original_chunk[sourceend], chunk_size - sourceend);
    mchecksum_get(tmp_chksum, checksum, sizeof(checksum_t), 1); // Comment 1
    daos_object_read(checksum_oh, original_checksum, sizeof(checksum_t));
    mchecksum_verify(original_chunk, original_checksum); // Comment 2
    mchecksum_verify(source data chunk, source checksum); // Comment 3
    daos_object_write(data_oh, source data chunk, offset, length);
    daos_object_write(checksum_oh, checksum, checksum_offset, sizeof(checksum_t));
    free(original_chunk);
    close all daos objects;
}
```

FIG. 9A

```
    int iod_daos_read(iod objectid, return data chunk, offset, length, return checksum)
    {
        data_oh = open_daos_data_object(iod objectid);
        checksum_oh = open_daos_checksum_object(iod objectid);
        checksum_offset = (offset/chunk_size) * sizeof(checksum_t);
        daos_object_read(data_oh, return data chunk, offset, length);
        daos_object_read(checksum_oh, return checksum, checksum_offset, sizeof(checksum_t);
        close all daos objects;
    }
```

FIG. 9B

```
int iod_daos_read(iod objectid, return data chunk, offset, length, return checksum)
{
    data_oh = open_daos_data_object(iod objectid);
    checksum_oh = open_daos_checksum_object(iod objectid);
    chunk_offset = round_down(offset); // get the start of the whole chunk;
    checksum_offset = (offset/chunk_size) * sizeof(checksum_t);
    original_chunk = malloc(chunk_size);
    daos_object_read(data_oh, original_chunk, chunk_offset, chunk_size);
    daos_object_read(checksum_oh, original_checksum, checksum_offset, sizeof(checksum_t);
    // Apply Slice operation defined in the previous chapter.
    return_data_chunk_offset = offset - chunk_offset;
    mchecksum_init("crc64", &tmp_chksum);
    mchecksum_update(tmp_chksum, original_chunk[return_data chunk_offset], length);
    mchecksum_get(tmp_chksum, &return checksum, sizeof(checksum_t));
    mchecksum_verify(original_chunk, original checksum);
    memcpy(return data chunk, &original_chunk[return_data chunk_offset], length);
    free(original_chunk);
    close all daos objects;
}
```

⎧ 950

END-TO-END DATA INTEGRITY IN PARALLEL STORAGE SYSTEMS

CROSS-REFERENCE TO RELATED APPLICATIONS

The present application is related to U.S. patent application Ser. No. 13/799,264, filed Mar. 13, 2013, entitled "Parallel Checksumming of Data Chunks of a Shared Data Object Using a Log-Structured File System," (now U.S. Pat. No. 9,436,722), and U.S. patent application Ser. No. 14/230,829, filed Mar. 31, 2014, entitled "Distributed Metadata in a High Performance Computing Environment," each incorporated by reference herein.

FIELD

The present invention relates to parallel storage in high performance computing environments.

BACKGROUND

In parallel computing systems, such as High Performance Computing (HPC) applications, data storage systems must deal with the increasing amounts of data to be processed. The inherently complex and large datasets increase the potential for data corruption and therefore the need for data integrity. As HPC environments grow to exascale (and larger) by becoming more distributed, the probability of silent data corruption (i.e., corruption unknown to the user) becomes more likely. Such data corruption cannot be allowed to remain silent.

Checksumming is one common technique for ensuring data integrity. A checksum or hash sum is a value computed from a block of digital data to detect errors that may have been introduced during transmission and/or storage. The integrity of the data can be checked at a later time by recomputing the checksum and comparing the recomputed checksum with the stored checksum. If the two checksum values match, then the data was likely not corrupted with a high probability.

A need exists for improved techniques for end-to-end integrity of the data in parallel computing systems, such as High Performance Computing (HPC) environments.

SUMMARY

Embodiments of the present invention provide end-to-end data integrity in parallel computing systems, such as High Performance Computing (HPC) environments. In one embodiment, a method is provided for processing data in a distributed data storage system by obtaining the data and one or more corresponding checksum values from a compute node; and providing the data and the one or more corresponding checksum values to the distributed data storage system for storage. One or more checksum values corresponding to the data can be generated if the one or more checksum values are not received from a compute node. Exemplary processes are provided for copy, slice, merge, and slice and merge functions.

In one exemplary embodiment, the distributed data storage system comprises one or more Parallel Log-Structured File System (PLFS) storage elements where data written from each of the compute nodes is appended into a corresponding file, and wherein information that maps a segment of logical data to a segment of physical data in the corresponding file is appended into an index entry in an index file with a timestamp entry, and wherein the index entry further comprises a checksum value of the written data.

In another exemplary embodiment, the distributed data storage system comprises one or more key-value storage elements storing one or more key-value pairs, and wherein a first checksum value of the key and a second checksum of the value are stored as a header in a storage element storing the value.

Advantageously, illustrative embodiments of the invention provide techniques for end-to-end data integrity in parallel computing systems. These and other features and advantages of the present invention will become more readily apparent from the accompanying drawings and the following detailed description.

BRIEF DESCRIPTION OF THE DRAWINGS

FIG. 5 is a flow chart illustrating an exemplary implementation of a slice operation incorporating aspects of the present invention;

FIG. 6A is a flow chart illustrating an exemplary implementation of a merge operation incorporating aspects of the present invention and FIG. 6B illustrates exemplary pseudo-code 650 for the merge operation of FIG. 6A;

FIG. 7 is a flow chart illustrating an exemplary implementation of the slice and merge operation based on the slice operation of FIG. 5 and the merge operation of FIG. 6A;

FIGS. 8A and 8B illustrate exemplary pseudo-code for a full write operation and a partial write operation, respectively;

FIGS. 9A and 9B illustrate exemplary pseudo-code for a full read operation and a partial read operation, respectively;

DETAILED DESCRIPTION

The present invention provides improved techniques for end-to-end data integrity in parallel computing systems, such as High Performance Computing (HPC) environments. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

In High-Performance Computing (HPC) environments, increasing scale has made it clear that two changes are necessary in future storage architectures. First, a network attached flash tier is needed for storing large amounts of data, such as checkpoints, before the data is asynchronously migrated to a large disk tier. In addition, a new storage interface is needed to replace Portable Operating System Interface (POSIX). According to one aspect of the invention, both challenges are addressed with an Input/Output (IO) Dispatcher (IOD) that manages the burst buffer tier. Generally, the IOD will provide end-to-end data integrity. Although existing data protections, such as cyclic redundancy checks (CRCs) and parity, are reliable, they have a small probability of failure. As scale increases, the probability of silent (i.e., unknown to the user) data corruption becomes more likely and must be detected.

Aspects of the present invention ensure data correctness along the entire software stack in an HPC Exascale burst data chunk, whereby corrupted data will be detected but not necessarily reconstructed. Additional aspects of the present invention provide end-to-end data integrity so that when the disk storage or memory corrupts data during Input/Output (IO) or memory operations, the data corruption will be detected and an error will be raised to notify the application. In one exemplary embodiment, the data integrity functionality is exported in the form of checksum parameters in the application programming interface (API), all the way to the application to provide full end-to-end data integrity protection against silent data corruption.

Figure 1:
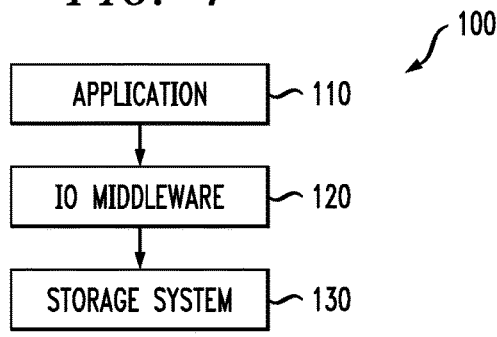
FIG. 1 illustrates an exemplary software stack comprising an application layer, an Input/Output (I/O) middleware layer and a storage layer.

FIG. 1 illustrates an exemplary software stack 100 comprising an application layer 110, an I/O middleware layer 120 and a storage system 130. Aspects of the present invention recognize that to obtain end-to-end integrity, all three layers 110, 120, 130 need to be modified so that each layer can verify whether or not the data is corrupted. To verify the data, all stored data is associated with a checksum, so that when the stored checksum does not match the checksum computed for the retrieved data, data corruption can be detected.

With the development of resource virtualization, the application layer 110 becomes farther from the storage hardware in the storage system 130. In addition, there are more layers between the application layer 110 and the storage hardware in the storage system 130, and if an error occurs within those middle layers, the application may receive corrupted data, and the application may not even notice that the data is corrupted.

Generally, in the application layer 110, an exemplary application needs to perform the following tasks:

1. For a write of data, the application layer 110 calculates and associates a checksum for the data sent to the I/O middleware layer 120. In a further variation, the I/O dispatcher or another entity in the I/O middleware layer 120 calculates and associates a checksum for the received data.

2. For a read of data, the I/O middleware layer 120 will return the data together with a checksum from the storage layer 130 to the application layer 110, and the application layer 110 must verify the data using the checksum. The I/O middleware layer 120 may have to perform multiple read operations from multiple buffers and verification and recomputation of checksum values if the data chunks are not aligned.

The I/O middleware layer 120 will move data and the corresponding checksum value(s) to the storage system 130. For some intelligent I/O middleware 120, however, such as the I/O dispatcher, the I/O middleware layer 120 will do additional work with the data to obtain better performance. For example, if an application does not provide a checksum value, I/O middleware 120, such as the I/O dispatcher, will compute the checksum value.

The storage layer 130 must store the checksum into the desired storage device with the corresponding data so that the solution provides end-to-end data integrity. Thus, when the data is retrieved in the future, the application 110 can be confident that the retrieved data is not corrupted.

It is noted that in some embodiments, storage elements are included in the I/O middleware layer 120. As discussed further below in conjunction with FIGS. 2, 3, and 8-13, Parallel Log-Structured File System (PLFS) storage elements and key-value storage elements are included in the exemplary I/O middleware layer 120. The data storage arrays 335 may be implemented, for example, as Distributed Application Object Storage (DAOS) sharded storage arrays. See, for example, "The Fast-Forward I/O and Storage Stack," https://users.soe.ucsc.edu/~ivo//blog/2013/04/07/the-ff-stack/, and/or "Fast Forward Storage and IO Program Documents," https://wiki.hpdd.intel.com/display/PUB/Fast+Forward+Storage+and+IO+Program+Documents, each incorporated by reference herein.

Figure 2:
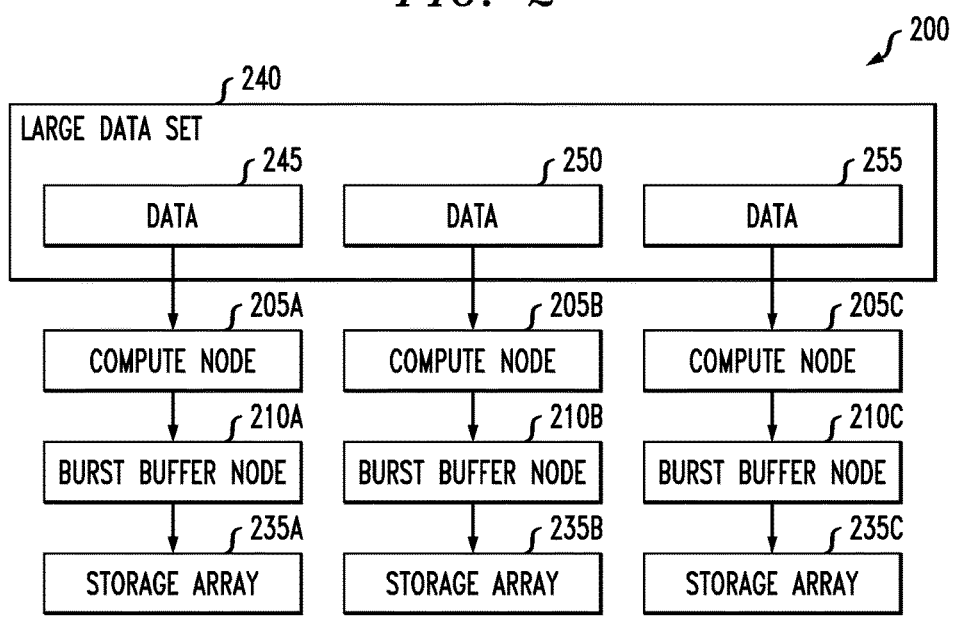
FIG. 2 illustrates an exemplary High Performance Computing (HPC) environment, in accordance with an embodiment of the present invention.

FIG. 2 illustrates an exemplary High Performance Computing (HPC) Environment 200, in accordance with an embodiment of the present invention. In the exemplary HPC environment 200 of FIG. 2, one or more computing nodes communicate with one or more burst buffers and data storage arrays. In various embodiments, the current disclosure may enable a HPC environment to distribute data and/or metadata (including checksum values) throughout an HPC environment on one or more data storage systems.

In the exemplary embodiment of FIG. 2, a large data set 240 is divided into two or more portions of data, such as data portions 245, 250, 255, to enable more efficient processing by each compute node. The data portions 245, 250, 255 may be generated on and processed by one or more compute nodes 205A-C. As shown in FIG. 2, data portion 245 is processed on compute node 205A, data portion 250 is processed on compute node 205B and data portion 255 is processed on compute node 205C. As discussed further below in conjunction with FIG. 3, I/O dispatchers (not shown in FIG. 2) manage data received from corresponding compute nodes 205.

While the exemplary embodiment of FIG. 2 suggests a one-to-one mapping between the burst buffer nodes 210 and storage nodes 235, I/O dispatchers may shuffle data between the burst buffer nodes 210 before sending it to storage nodes 235 (e.g., DAOS, as discussed below). The data in the burst buffer nodes 210 is logged and optionally shuffled so that the data on the storage nodes 235 is striped. Also, as discussed further below, the metadata on the burst buffer nodes 210 is logged, and it also gets shuffled so that it will be striped alongside its data on storage nodes 235 (e.g., DAOS).

It is noted that it is not required that the data is shuffled first. Instead, every burst buffer node 210 can write each of its pieces of data to wherever it will eventually go in the DAOS shards. However, this means that there will be N-squared connections as potentially every burst buffer node 210 will send small data to each DAOS shard. The shuffling is optionally performed so that instead one burst buffer 210 collects all of the data going to one shard from the other burst buffers 210 and then does one write to that shard. This reduces the number of writers per shard to just one writer process and translates a plurality of small I/O operations into one larger I/O operation.

It is further noted that small I/Os still occur during the shuffle phase. It has been found, however, that it is better to do small I/O during the shuffle phase than during the write phase since the shuffling happens on an interconnect network between the burst buffer nodes 210 as opposed to the much slower storage network connecting the DAOS shards to the burst buffer nodes 210.

Additionally, on a read, each burst buffer 210 can read from one DAOS shard only and then shuffle between the burst buffers 210. Thus, the small I/Os occur between burst buffers 210 either before sending large I/Os to DAOS or after receiving large I/Os from DAOS.

In various embodiments, each compute node 205 may be in communication with a corresponding burst buffer appliance 210A-C which may be in communication with one or more corresponding data storage arrays 235A-C. The burst buffer appliances 210 may also be referred to as I/O Nodes (IONs). As discussed further below in conjunction with FIG. 3, an exemplary burst buffer appliance 210 may include an I/O dispatcher, distributed Key-Value (KV) store, a fast data storage buffer and an index. In some embodiments, a fast data storage buffer may be flash storage and/or another fast storage device.

FIG. 2 illustrates a workload comprised of a large parallel application executing on the compute nodes 205 and potentially a secondary analysis program running directly on the burst buffer appliances 210. In a further variation, multiple process groups can share burst buffer appliances 210. To share data among burst buffer appliances 210, the application on the compute nodes 205 and the analysis program on the burst buffer appliances 210 must be connected to the same set of I/O dispatcher (not shown in FIG. 2) processes.

In the exemplary embodiment of FIG. 2, compute node 205A is in communication with burst buffer node 210A, which is in communication with data storage array 235A. Compute node 205B is in communication with burst buffer node 210B, which is in communication with data storage array 235B. Compute node 205C is in communication with burst buffer node 210C, which is in communication with data storage array 235C.

In the embodiment of FIG. 2, each burst buffer node 210 is enabled to communicate with other burst buffer nodes 210 to enable creation, deletion, and/or management of metadata stored on each respective burst buffer node 210, as discussed further below in conjunction with FIG. 3.

Figure 3:
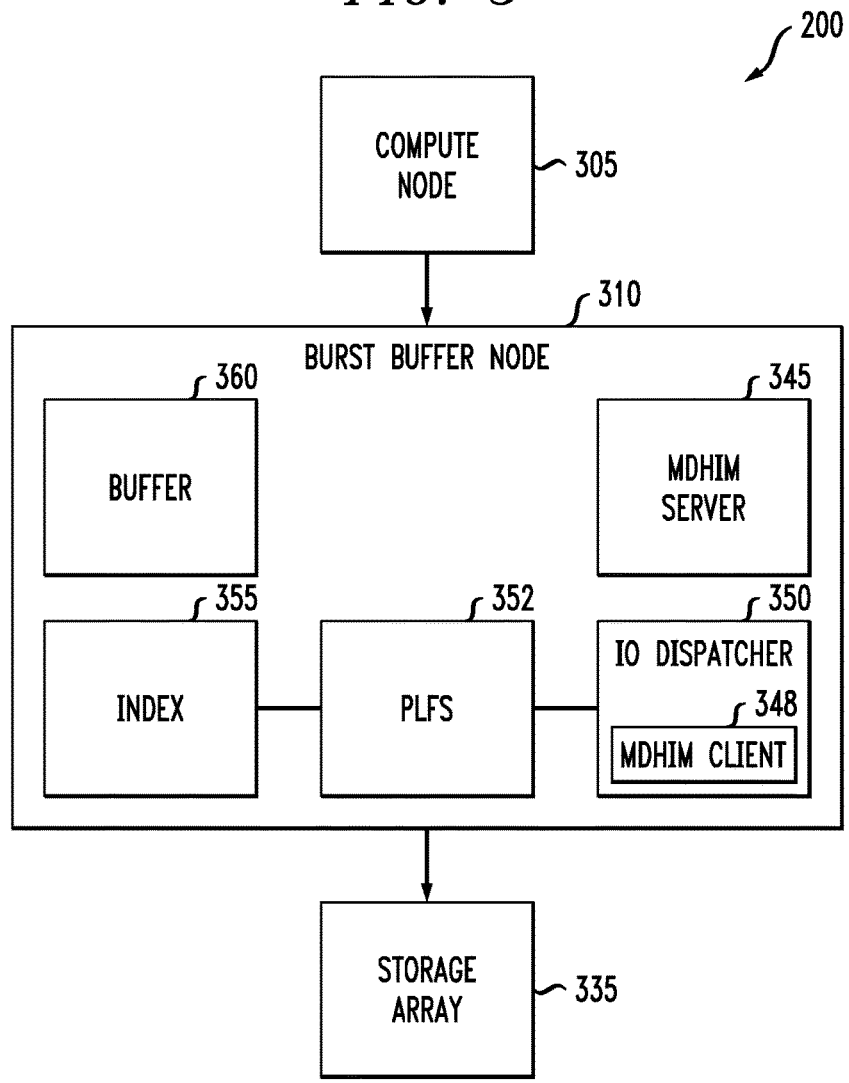
FIG. 3 illustrates portions of the exemplary High Performance Computing (HPC) environment of FIG. 2 in further detail.

FIG. 3 illustrates portions of the exemplary High Performance Computing (HPC) environment 200 of FIG. 2 in further detail. As shown in FIG. 3, the exemplary HPC environment 200 comprises an exemplary compute node 305 in communication with a burst buffer appliance 310, which may be in communication with one or more data storage arrays 335. Generally, as discussed further below, compute node 305 sends one or more data chunks and a corresponding checksum to be processed by burst buffer node 310, in accordance with an embodiment of the present invention.

The data storage arrays 335 may be implemented, for example, as DAOS sharded storage arrays.

The exemplary burst buffer node 310 further comprises a flash storage buffer 360, an index 355, an I/O dispatcher 350, a distributed Key-Value (KV) store, such as a Multi-Dimensional Hashing Indexing Middleware (MDHIM) server 345, and PLFS burst buffer software 352. As discussed hereinafter, the I/O dispatcher 350 processes any received data based on the indicated object type and the storage destination. In one exemplary implementation, the data may comprise a blob, a multidimensional array or a key-value object type. Array objects store structured multi-dimensional data structures. Blob objects are analogous to POSIX files: simple one-dimensional arrays of bytes. Key-value objects are stored in a parallel key-value store. In this manner, aspects of the present invention support storage of user data in structured array objects, unstructured "blob" objects and key-value objects.

Generally, data having a blob or array object type is transformed out of a PLFS environment (flash storage buffer 360 and index 355) for storage on storage array 335. Likewise, data having a key-value object type is stored in the MDHIM server 345. The manner in which the data and corresponding checksums are handled (e.g., written and read) for each type of storage destination is discussed further below in a section entitled "Storage Layer."

The burst buffer node 310 is assumed to comprise a flash memory or other high-speed memory having a substantially lower access time than a disk storage tier. The burst buffer node 310 may optionally comprise an analytics engine, and may include other components. Although flash memory will often be used for the high-speed memory of the burst buffer node 310, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer node" or "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes and a file system, such as storage tiers, for storing bursts of data associated with different types of I/O operations.

The burst buffer node 310 further comprises a processor coupled to a memory (not shown in FIG. 3). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

As discussed hereinafter, the exemplary I/O dispatcher 350 performs any necessary recomputations when requested data chunks are not aligned.

PLFS Data

Generally, flash storage buffer 360 and index 355 store data and metadata (including checksum values), respectively, in a PLFS format. The PLFS data and metadata (including checksum values) stored in the flash storage buffer 360 and index 355, respectively, may optionally be migrated to one or more storage arrays 335 (e.g., transactional object storage). Generally, as discussed further below in conjunction with FIG. 10, the I/O dispatcher 350 reads the index 355 to process the PLFS data in flash storage buffer 360 for storage in the one or more storage arrays 335 in a different format. The I/O dispatcher 350 employs PLFS burst buffer software 352 to write and read PLFS data to/from the flash storage buffer 360.

The PLFS burst buffer software 352 may be based on, for example, John Bent et al., "PLFS: A Checkpoint Filesystem for Parallel Applications," Intl Conf. for High Performance Computing, Networking, Storage and Analysis 2009 (SC09) (November 2009), incorporated by reference herein.

Key-Value Data

In one or more embodiments, a HPC environment manages metadata using a Message Passing Interface (MPI)-sharded KV store, such as a Multidimensional Data hashing Indexing Middleware (MDHIM). Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide parallel storage systems with a burst buffer appliance for storage of a partitioned key-value store across one or more storage tiers. While the exemplary embodiments of the present invention employ Multidimensional Data Hashing Indexing Metadata/Middleware (MDHIM), other MPI-Linked partitioned data stores can be employed, as would be apparent to a person of ordinary skill in the art.

The exemplary I/O dispatcher 350 comprises an MDHIM client 348 to (i) communicate with MDHIM servers 345 on the same and/or different burst buffer nodes 310, and/or (ii) manage metadata created by the I/O dispatcher 350 relating to received data I/Os. Generally, MDHIM server 345 enables each burst buffer node 310 to manage a portion of metadata associated with data stored on burst buffer node 310 and/or data storage array 335.

One or more MDHIM servers 345 in the disclosed partitioned key-value store provide an interface between one or more local key-value stores and one or more additional storage architectures. In addition, one or more servers 345 in the disclosed partitioned key-value store optionally provide a key value interface that provides access to at least one hardware key-value store.

For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

An exemplary MDHIM application programming interface (API) comprises the following exemplary operations:

MDHIM init—initializes MDHIM structures and creates range server threads.
MDHIM_PUT—put one or more keys in a data store
MDHIM_GET—get one or more keys from the data store
MDHIM insert—a list function that inserts new records with key and record data
MDHIM flush—makes key distribution information available to MDHIM clients
MDHIM find—find a record using primary key (match, best higher or lower) and set the absolute record number.
MDHIM close—close an MDHIM file
MDHIM read—a list function that read records (key and data), using absolute record numbers MDHIM server 345 is enabled to store metadata (including checksum values) in HPC environment 200. In the embodiment of FIG. 3, compute node 305 sends data and user-created metadata (i.e., {key, tid, value}) to I/O dispatcher 350. I/O dispatcher 350 translates user-created metadata to MDHIM metadata and stores the MDHIM metadata in MDHIM Server 345. I/O dispatcher 350 updates index 355 with key-TID pair{Key, TID}. I/O dispatcher 350 stores data in flash storage buffer 360. In many embodiments, metadata and/or data stored within a HPC Environment may be synchronized by storing and/or indexing key-values including Transaction IDs.

In one embodiment, a first MDHIM Server 345 stores metadata related to objects, a second MDHIM Server 345 stores metadata related to containers, and a third MDHIM Server 345 stores metadata related to checkpoints and transactions. In this embodiment, each burst buffer node 310 includes a MDHIM Client 348 enabled to communicate which each respective MDHIM Server 345 to create, delete, retrieve, and/or manage metadata stored in each respective MDHIM Server 345. A request to retrieve object metadata would be sent to the first MDHIM Server 345. A request to retrieve container metadata would be sent to the second MDHIM Server 345. A request to retrieve checkpoint and/or transaction metadata would be sent to the third MDHIM Server 345.

In FIG. 3, an I/O dispatcher 350 in a given burst buffer node 310 is enabled to communicate with other I/O dispatchers on other burst buffer nodes 310 to coordinate and/or synchronize data, transactions, checkpoints, and/or events stored at the respective I/O dispatcher.

Integrity Using Checksums

A data chunk represents a piece of user data that has or will be given an associated checksum. A data chunk is the basic unit handled by the disclosed algorithm(s). A region is a portion of a data chunk. With reference to FIG. 1, I/O middleware 120 only stores/retrieves data between the application layer 110 and storage system 130, so all the data chunks generated inside the I/O dispatcher 350 are derived from the data chunks from the application layer 110 or storage system 130 using the following four exemplary operations:

Copy: copy data from a target data chunk to a new data chunk, as discussed further below in conjunction with FIG. 4;

Slice: copy a region of a target data chunk into a new data chunk, as discussed further below in conjunction with FIG. 5;

Merge: copy several target data chunks into a new data chunk in a specific order (e.g., the user is doing a large aligned read that spans multiple data chunks on storage), as discussed further below in conjunction with FIGS. 6A and 6B; and Slice and Merge: copy regions from several target data chunks into a new data chunk in a specific order (e.g., the user is doing an unaligned read that spans the second half of one data chunk and the first half of another), as discussed further below in conjunction with FIG. 7.

In accordance with aspects of the present invention, checksums are applied to the target data chunks to ensure that the checksum of the new data chunk is correct.

In one exemplary embodiment, the checksum algorithm works as an accumulator such that the checksum algorithm can process multiple data chunks individually and the checksum algorithm will accumulate a checksum value incrementally for each one. The checksum value returned is identical to the value that would be returned if the multiple data chunks were concatenated into one contiguous region and input into the checksum algorithm.

The exemplary checksum algorithm provides the following main functions:

int mchecksum_init(const char*hash_method, mchecksum_object_t*checksum);
    int mchecksum_get(mchecksum_object_t checksum, void*buf, size_t size, int finalize);
    int mchecksum_update(mchecksum_object_t checksum, const void*data, size_t size);

The checksum init function creates a new empty checksum object. The checksum update function increments the checksum object by giving the checksum object a new data region. The checksum get function can be used to finalize the checksum object and get the checksum back as a collection of bytes.

For each of the four operations identified above (copy, slice, merge, slice and merge), the following exemplary algorithms are defined that accept a set of one or more source data chunks or regions and return one contiguous data chunk and an associated checksum. Each source data chunk has its own checksum, referred to as a source checksum. These operations happen every time data is moved through the I/O dispatcher 350.

Figure 4:
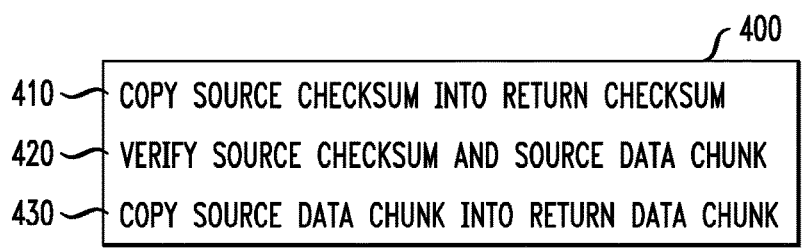
FIG. 4 is a flow chart illustrating an exemplary implementation of a copy operation incorporating aspects of the present invention.

FIG. 4 is a flow chart illustrating an exemplary implementation of the copy operation 400 incorporating aspects of the present invention. As shown in FIG. 4, the exemplary copy operation 400 comprises copying the source checksum into the return checksum during step 410; verifying the source checksum and source data chunk during step 420; and copying the source data chunk into the return data chunk during step 430.

It is noted that the exemplary ordering shown in FIG. 4 prevents silent data corruption regardless of when it occurs. For example, if the source data chunk is corrupted between steps 420 and 430, then the return data chunk will contain the corrupted data. However, since the return checksum was copied before verifying the source data chunk, the corrupted data will not match the checksum and the corruption will be correctly detected. The other operations are more complex but provide this same guarantee.

FIG. 5 is a flow chart illustrating an exemplary implementation of the slice operation 500 incorporating aspects of the present invention. As shown in FIG. 5, the exemplary slice operation 500 comprises calculating return checksum from the source region of the source data chunk during step 510; verifying the source checksum against the source data chunk during step 520; copying the source region from the source data chunk into the return data chunk during step 530; and returning the return data chunk and return checksum during step 540.

It is noted that the return checksum is calculated during step 510 based on the data from the source data chunk, and then the source data chunk is verified during step 520. The exemplary order is important so that if data corruption occurs, the return data chunk and return checksum will not match, or the source data chunk will fail the verification. In this manner, silent data corruption will not occur.

FIG. 6A is a flow chart illustrating an exemplary implementation of the merge operation 600 incorporating aspects of the present invention. As shown in FIG. 6A, the exemplary merge operation 600 comprises creating an empty return checksum during step 610; and for every source chunk (ordered correctly) during step 620, repeating steps 630-650, as follows: accumulate the source data chunk into the return checksum during step 630; verify the source data chunk with its checksum during step 640 and copy the source data chunk into its appropriate location in the return data chunk during step 650. The return data chunk and return checksum are returned during step 660.

FIG. 6B illustrates exemplary pseudo-code 650 for the merge operation 600 of FIG. 6A. Assume that it is desired to construct a new data chunk (retbuf, retchk) from a list of source data chunks [(buf1, chk1), (buf2, chk2), (buf3, chk3)]. FIG. 6B illustrates how the code 650 is composed for the retchk and retbuf data chunks.

Note the ordering in the pseudo-code 650 of the lines marked 'COMMENT ONE' and 'COMMENT TWO.' This ordering is important to prevent a race condition in which the data can be corrupted between the copy and verify operations.

FIG. 7 is a flow chart illustrating an exemplary implementation of the slice and merge operation 700 incorporating aspects of the present invention. The exemplary slice and merge operation 700 is a combination of the slice operation 500 (FIG. 5) and Merge operation 600 (FIG. 6A). As shown in FIG. 7, the exemplary slice and merge operation 700 comprises creating an empty return checksum during step 710; and for every source region (ordered correctly) during step 720, repeating steps 730-750, as follows: accumulate the source region of the source data chunk into the return checksum during step 730; verify the entire source data chunk with its checksum during step 740; and copy the region of the source data chunk into its appropriate location in the return data chunk during step 750. The return data chunk and return checksum are returned during step 760.

Based on these four basic operations 400, 500, 600, 700 shown in FIGS. 4-7, a new data chunk can be produced with the correct checksum, based on several source data chunks and then the checksums associated with them can be verified.

Storage Layer

DAOS Sharded Storage Arrays

As noted above, storage layer 130 optionally comprises one or more storage arrays, such as Distributed Application Object Storage (DAOS) sharded storage arrays. See, for example, "The Fast-Forward I/O and Storage Stack," https://users.soe.ucsc.edu/~ivo//blog/2013/04/07/the-ff-stack/, incorporated by reference herein.

When the I/O dispatcher 350 stores data into one or more DAOS sharded storage arrays, the data is striped across a set of DAOS objects, referred to as data objects. Each data object has an associated checksum object. The DAOS objects are divided into fixed-sized data chunks, each of which has a checksum stored in an associated checksum object. For chunk N in the data object, its checksum is stored at offset of (N*sizeof(checksum_t)) at the checksum object. See, for example, U.S. patent application Ser. No. 14/319,301 entitled "Storing Data and Metadata in Respective Virtual Shards on Sharded Storage Systems," filed contemporaneously herewith and incorporated by reference herein.

Every modification to a data chunk will cause an update to the entire chunk and the corresponding checksum so that the data chunk and the corresponding checksum remain consistent. The following sections describe how to handle write/read operations for DAOS objects.

When performing a write operation in DAOS, the following cases need to be considered:
1. The user wants to write a full checksum chunk; or
2. The user wants to write part of a checksum chunk.

All write operations can be treated as a combination of the above two cases.

FIG. 8A illustrates exemplary pseudo-code 800 for a full write operation. As shown in FIG. 8A, the writes of the data and corresponding checksum are processed separately.

FIG. 8B illustrates exemplary pseudo-code 850 for a partial write operation to write a portion of a checksum chunk. As shown in FIG. 8B, the writes of the data and corresponding checksum are again processed separately and also include additional checksum, read and verify operations to accommodate the partial write operation. A chunk offset indicates the start of the entire chunk.

As noted above, the data chunk must be verified after using it. The chunk read from the data object and the source data chunk are verified after the new checksum is constructed. See, Comments 1-3 in the pseudo code 850.

When performing a read operation in DAOS, a full read and a partial read from a chunk are handled in a similar manner to the respective write operations of FIGS. 8A and 8B.

FIG. 9A illustrates exemplary pseudo-code 900 for a full read operation. As shown in FIG. 9A, the reading of a data chunk and corresponding checksum are processed separately.

FIG. 9B illustrates exemplary pseudo-code 950 for a partial read operation. As shown in FIG. 9B, the reading of the data chunk and corresponding checksum are again processed separately and also include additional checksum, get and verify operations to accommodate the partial read operation. A chunk offset indicates the start of the entire chunk.

In this manner, read and write operations to DAOS can be handled correctly with checksums to prevent silent data corruption. Checksums can be stored, updated or retrieved from the DAOS storage system successfully.

PLFS Storage in Middleware

As noted above, Parallel Log-Structured File System (PLFS) storage elements are optionally included in the exemplary I/O middleware layer 120. In PLFS, the data to be written from different compute nodes 205 will be appended into different physical files to obtain improved performance. The possible conflicts between different write operations will be resolved according to a timestamp when the application wants to read the data back. Aspects of the present invention address checksum handling for PLFS storage elements.

Figure 10:
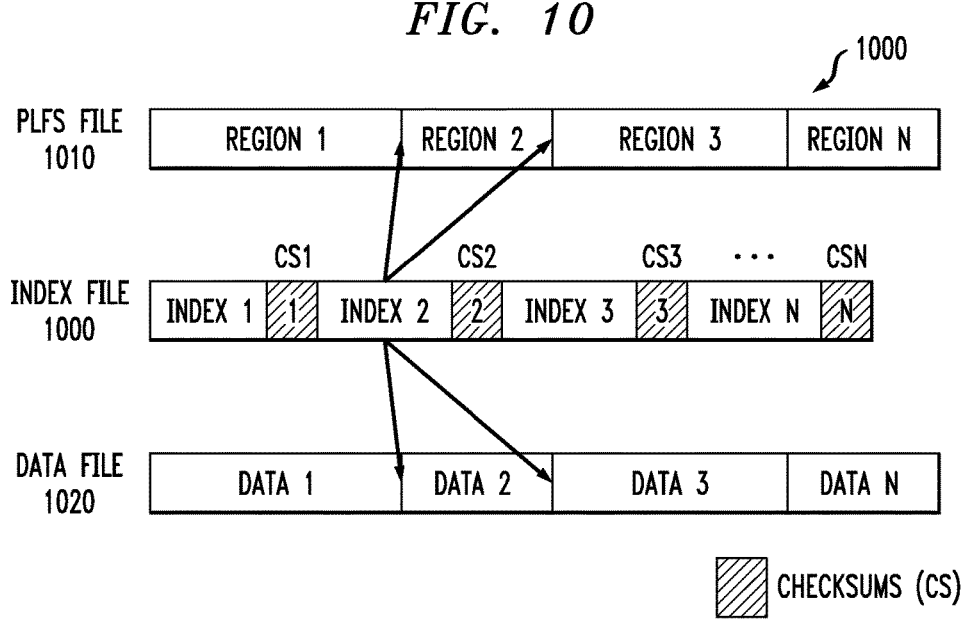
FIG. 10 illustrates an index file for a logical PLFS file that incorporates aspects of the present invention.

FIG. 10 illustrates an index file 1000 for a logical PLFS file 1010 that incorporates aspects of the present invention. For every write operation, the data, e.g., DataN, is appended to the data file 1020, and the mapping information of the logical data in the PLFS file 1010 and the physical data in the data file 1020 is appended into an entry, e.g., IndexN, of the index file 1000. The data in the data file 1020 is supplied by the application, and the entries in the index file 1000 are generated by the PLFS software 352 to track the write operation so that the data can be read back later.

Thus, as shown in FIG. 10, every index entry in the index file 1000 maps a segment in the logical PLFS file 1010 to a segment in the data file 1020 with timestamp information so that conflicts can be resolved.

Aspects of the present invention extend the index entries to accommodate a checksum value (CSN) of the written data to the index entry in the index file 1000 associated with this write operation as shown in FIG. 10. In this manner, with the checksum feature enabled, write operations are efficient with good performance, since only the checksum value needs to be verified and the checksums are written into the index file 1000. The checksum verification is fast and the checksums are much smaller compared to the data. Thus, performance will be satisfactory.

In one variation, a write request is disallowed that covers a very large segment. When the data is read from the data file 1020, it will be verified as a single object, so if a very large segment is written, the whole segment back will be required to be read to verify its correctness whenever part of it is accessed. Thus, one exemplary implementation splits a very large write operation into smaller chunks (such as 4 MB) to improve the read performance.

For a PLFS read operation, all the index entries in those index files 1000 are loaded into memory to construct a global index tree, as discussed further below in conjunction with FIG. 11. For every piece of data in the PLFS logical file 1010, the PLFS software 352 can find where the data is in the data files 1020.

Considering that the written data in the data files 1020 might overlap with each other, only parts of the original data written may remain valid in this PLFS logical file 1010, as the other parts might have already been overwritten. Currently, the PLFS software 352 will simply discard those invalid parts.

The checksum is calculated based on the whole data chunk in the write operation, so the whole data chunk is read as the write operation so that it can be verified against the checksum in the index entry of the index file 1000. This requirement changes the manner in which the index tree is constructed and the read operations are performed.

In one exemplary implementation all index entries are treated as a whole object that cannot be split or merged.

Figure 11:
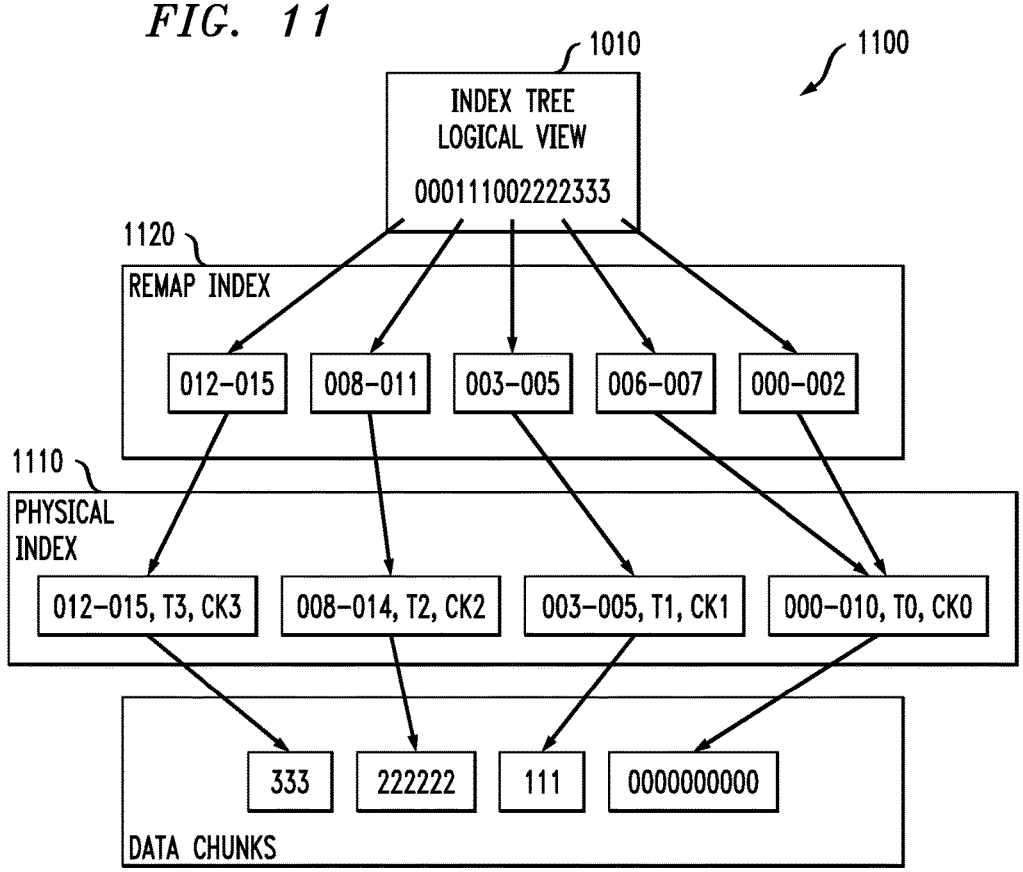
FIG. 11 illustrates a logical view of an exemplary PLFS index tree that incorporates checksums in accordance with aspects of the present invention.

FIG. 11 illustrates a logical view of an exemplary PLFS index tree 1100 that incorporates checksums in accordance with aspects of the present invention. As shown in FIG. 11, the exemplary PLFS index tree 1100 comprises three layers. The exemplary PLFS index tree 1100 comprises physical entries 1110 that are loaded directly from the index file 1000 of FIG. 10. Due to the checksums (CK) contained therein, physical entries 1110 are treated as a single object without splitting or merging. Remap entries 1120 are entries in the global index tree. Remap entries 1120 map a segment in the PLFS logical file 1010 to a whole/part of the physical entry 1110. Thus, the index tree 1100 maps from a logical offset to the remap entries 1120, to enable mapping information of a given segment in the PLFS logical file 1010 to be found. The tree 1100 contains non-overlapped logical segments of the PLFS logical file 1010.

Figure 12:
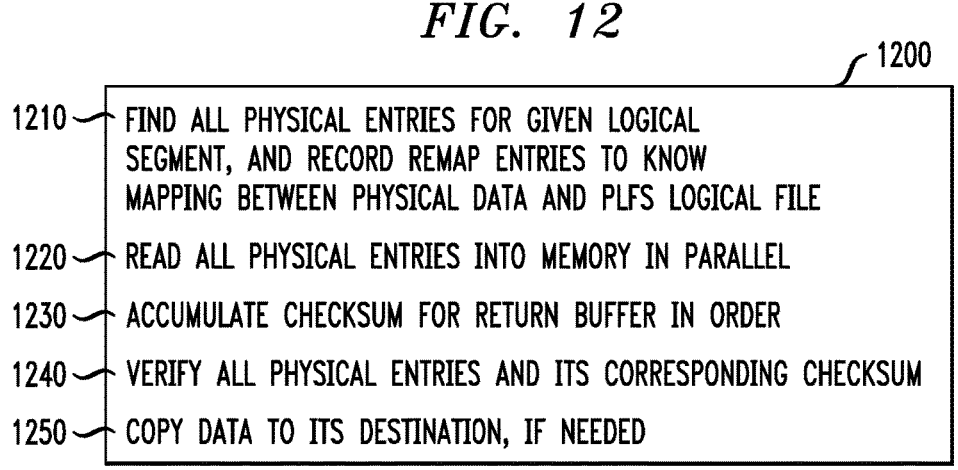
FIG. 12 is a flow chart illustrating an exemplary implementation of a PLFS read operation incorporating aspects of the present invention.

FIG. 12 is a flow chart illustrating an exemplary implementation of a PLFS read operation 1200 incorporating aspects of the present invention. Generally, for read tasks, the thread pool will be used to improve the performance. In the exemplary implementation of FIG. 12, the read operation is divided into five steps. As shown in FIG. 12, the PLFS read operation 1200 initially finds all the physical entries for a given logical segment, and records the remap entries to know the mapping between the physical data and the PLFS logical file 1001. This is performed in the main thread since it is a pure memory operation.

During step 1220, the PLFS read operation 1200 reads all of the physical entries into memory in parallel. The checksum is accumulated for the return data chunk in order during step 1230. The checksum chunk sizes are determined, for example, by selecting a size that is likely to be accessed by the application. When the size of the requested I/O is close to the size of the checksum chunk size, then the I/O will be faster.

Note that the order is important to the correctness of the checksum. The physical entries and their corresponding checksum are verified during step 1240. This can optionally be done in parallel as an optimization.

The data is then copied during step 1250 into its destination, if needed. Step 1250 only needs to be done if only part of the physical entry is included in the return data chunk.

For step 1220, if the whole physical entry is still valid and covered by the logical segment, then the data chunk supplied by the user is used to store the data read from the data file, so that the memory copy in step 1250 can be avoided. However, if only parts of the physical entry is valid or covered by the logical segment, then a new data chunk must be allocated to hold the whole physical entry and the data must be moved to the proper location in step 1250. Using the terminology employed above, copy and merge operations do not require the memory copy but slice and slice/merge operations do require the memory copy.

In this manner, checksums can be handled in plfs_read( ) and plfs_write( ) and only a very small overhead is added to PLFS. If there is no data overlap and a partial read operation, then the overhead is only caused by checksum verification and calculation, which is unavoidable.

Key-Value Store

As noted above, key-value (K-V) storage elements, such as an MDHIM server 345 are optionally included in the exemplary I/O middleware layer 120. A key-value checksum would be associated with the entire K-V value. Thus, with respect to a key-value checksum, only the copy operation is required (merge, slice, or slice and merge operations are not required). In one exemplary implementation, the key checksum and the value checksum are a header at the front of the value.

Figure 13:
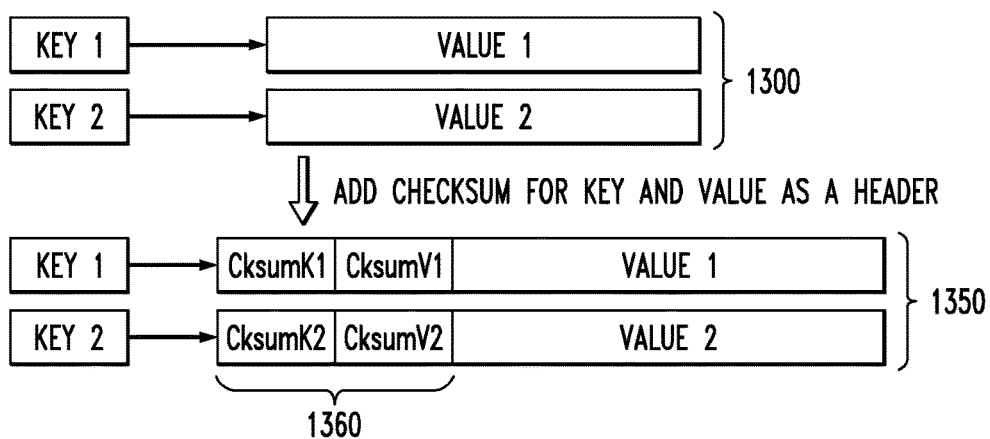
FIG. 13 illustrates an exemplary technique for storing checksum values in a key-value store.

FIG. 13 illustrates an exemplary technique for storing checksum values in a key-value store. As shown in FIG. 13, for exemplary key-value pairs, such as pair key1-value1 or pair key2-value2, stored in key-value structures 1300 the corresponding cksumK1/cksumV1 and cksumK2/cksumV2, respectively, are added as a header 1360 to modified key-value structures 1350.

The API for a K-V store works on the entire key-value pair structure 1300, 1350. Thus, the header 1360 can be obtained with the key-value pair, and there is no need to do a slice or merge operation for the header 1360.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

Figure 14:
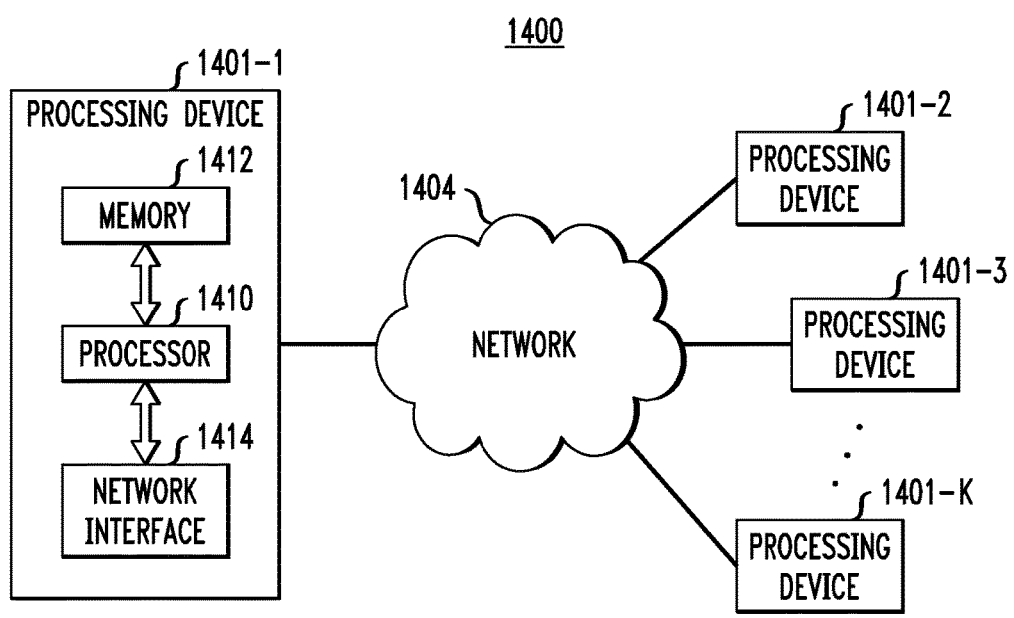
FIG. 14 illustrates an exemplary processing platform in which aspects of the present invention can be employed.

FIG. 14 illustrates an exemplary processing platform in which aspects of the present invention can be employed. The exemplary processing platform 1400 comprises a plurality of processing devices, denoted 1401-1, 1401-2, 1401-3, . . . 1401-K, that communicate with one another over a network 804. The network 804 may comprise any type of network, such as a WAN, a LAN, a satellite network, a telephone or cable network, or various portions or combinations of these and other types of networks.

The processing device 1401-1 in the processing platform 1400 comprises a processor 1410 coupled to a memory 1412. The processor 1410 may comprise a microprocessor, a microcontroller, an application-specific integrated circuit (ASIC), a field-programmable gate array (FPGA) or other type of processing circuitry, as well as portions or combinations of such circuitry elements, and the memory 1412, which may be viewed as an example of a "computer program product" having executable computer program code embodied therein, may comprise random access memory (RAM), read-only memory (ROM) or other types of memory, in any combination.

Also included in the processing device 1401-1 is network interface circuitry 1414, which is used to interface the processing device with the network 1404 and other system components, and may comprise conventional transceivers.

The other processing devices 1401 of the processing platform 1400 are assumed to be configured in a manner similar to that shown for processing device 1401-1 in the figure.

Again, the particular processing platform 1400 shown in FIG. 14 is presented by way of example only, and system 200 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIGS. 2, 3 and 5 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for processing data in a distributed data storage system, said method comprising:
   obtaining said data and one or more corresponding checksum values from a compute node;
   appending, using at least one processing device of a log structured file system, said data to a corresponding data file;
   generating, using said at least one processing device of said log structured file system, a metadata index entry in an index file that maps said data in the corresponding data file to a log structured file, wherein said metadata index entry further comprises a checksum value of the data generated by said at least one processing device of said log structured file system;
   providing said metadata index entry to a key-value store for storage as a key-value pair comprising a key and a value comprising said metadata index entry, wherein a first checksum value of said key and a second checksum of said value comprising said metadata index entry are stored as a header in a storage element storing said value; and
   providing said data file to said distributed data storage system for storage.

2. The method of claim 1, further comprising the step of generating said one or more checksum values corresponding to said data if said one or more checksum values are not received from a compute node.

3. The method of claim 1, further comprising the step of providing said data and said one or more corresponding checksum values from said distributed data storage system to an application that reads said data.

4. The method of claim 3, wherein said step of providing said data and said one or more corresponding checksum values from said distributed data storage system to said application further comprises the steps of performing a plurality of read operations from a plurality of buffers, and verifying and recomputing said one or more corresponding checksum values if one or more data chunks are not aligned.

5. The method of claim 1, wherein a step of copying data from a target data chunk to a new data chunk further comprises the steps of copying a source checksum value into a return checksum value; verifying the source checksum value and source data chunk; and copying the source data chunk into the return data chunk.

6. The method of claim 1, wherein a step of copying a region of a target data chunk into a new data chunk further comprises the steps of calculating a return checksum value from a source region of a source data chunk; verifying a source checksum value against the source data chunk; copying the source region from the source data chunk into a return data chunk; and returning the return data chunk and corresponding checksum.

7. The method of claim 1, wherein a merge of data comprises copying one or more target data chunks into a new data chunk in a specific order by performing the following steps: creating an empty return checksum; for every source data chunk, performing the following steps: accumulate the source data chunk into the return checksum; verify the source data chunk with its checksum and copy the source data chunk into a location in a return data chunk; and returning said return data chunk and said return checksum.

8. The method of claim 1, wherein a slicing and merging of data comprises copying regions from one or more target data chunks into a new data chunk in a specific order by performing the steps of creating an empty return checksum; for every source region performing the following steps: accumulate a source region of a source data chunk into a return checksum; verify the source data chunk with its checksum; and copy a region of the source data chunk into a location in the return data chunk; and returning the return data chunk and return checksum.

9. The method of claim 1, wherein a modification to a data chunk causes an update to an entire chunk and a corresponding checksum.

10. The method of claim 1, wherein said method is implemented by a burst buffer appliance.

11. An apparatus for processing data in a distributed data storage system, said apparatus comprising:
a memory; and
at least one hardware device operatively coupled to the memory and configured to:
obtaining said data and one or more corresponding checksum values from a compute node; and
appending, using at least one processing device of a log structured file system, said data to a corresponding data file;
generating, using said at least one processing device of said log structured file system, a metadata index entry in an index file that maps said data in the corresponding data file to a log structured file, wherein said metadata index entry further comprises a checksum value of the data generated by said at least one processing device of said log structured file system;
providing said metadata index entry to a key-value store for storage as a key-value pair comprising a key and a value comprising said metadata index entry, wherein a first checksum value of said key and a second checksum of said value comprising said metadata index entry are stored as a header in a storage element storing said value; and
providing said data file to said distributed data storage system for storage.

12. The apparatus of claim 11, wherein said at least one hardware device is further configured to generate said one or more checksum values corresponding to said data if said one or more checksum values are not received from a compute node.

13. The apparatus of claim 11, wherein said at least one hardware device is further configured to provide said data and said one or more corresponding checksum values from said distributed data storage system to an application that reads said data.

14. The apparatus of claim 13, wherein said data and said one or more corresponding checksum values are provided from said distributed data storage system to said application by performing a plurality of read operations from a plurality of buffers and verifying and recomputing said one or more corresponding checksum values if one or more data chunks are not aligned.

15. The apparatus of claim 11, wherein data is copied from a target data chunk to a new data chunk by copying a source checksum value into a return checksum value; verifying the source checksum value and source data chunk; and copying the source data chunk into the return data chunk.

16. The apparatus of claim 11, wherein a region of a target data chunk is copied into a new data chunk by calculating a return checksum value from a source region of a source data chunk; verifying a source checksum value against the source data chunk; copying the source region from the source data chunk into a return data chunk; and returning the return data chunk and corresponding checksum.

17. The apparatus of claim 11, wherein a merge of data comprises copying one or more target data chunks into a new data chunk in a specific order by performing the following steps: creating an empty return checksum; for every source data chunk, performing the following steps: accumulate the source data chunk into the return checksum; verify the source data chunk with its checksum and copy the source data chunk into a location in a return data chunk; and returning said return data chunk and said return checksum.

18. The apparatus of claim 11, wherein a slicing and merging of data comprises copying regions from one or more target data chunks into a new data chunk in a specific order by performing the steps of creating an empty return checksum; for every source region performing the following steps: accumulate a source region of a source data chunk into a return checksum; verify the source data chunk with its checksum; and copy a region of the source data chunk into a location in the return data chunk; and returning the return data chunk and return checksum.

19. The apparatus of claim 11, wherein a modification to a data chunk causes an update to an entire chunk and a corresponding checksum.

20. An article of manufacture for processing data in a distributed data storage system, said article of manufacture comprising a non-transitory machine readable recordable storage medium containing one or more programs which when executed implement the steps of:
obtaining said data and one or more corresponding checksum values from a compute node; and appending, using at least one processing device of a log structured file system, said data to a corresponding data file;

generating, using said at least one processing device of said log structured file system, a metadata index entry in an index file that maps said data in the corresponding data file to a log structured file, wherein said metadata index entry further comprises a checksum value of the data generated by said at least one processing device of said log structured file system;

providing said metadata index entry to a key-value store for storage as a key-value pair comprising a key and a value comprising said metadata index entry, wherein a first checksum value of said key and a second checksum of said value comprising said metadata index entry are stored as a header in a storage element storing said value; and providing said data file to said distributed data storage system for storage.

* * * * *